(12) United States Patent
Boyd et al.

(10) Patent No.: US 11,286,881 B2
(45) Date of Patent: Mar. 29, 2022

(54) GAS TURBINE ENGINE WITH REVERSIBLE HEAT EXCHANGER

(71) Applicant: Rolls-Royce North American Technologies Inc., Indianapolis, IN (US)

(72) Inventors: Douglas Boyd, Indianapolis, IN (US); Douglas D. Dierksmeier, Franklin, IN (US); Douglas J. Snyder, Carmel, IN (US); Graham Burkholder, Avon, IN (US); William B. Bryan, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 299 days.

(21) Appl. No.: 16/654,706

(22) Filed: Oct. 16, 2019

(65) Prior Publication Data

US 2021/0115877 A1    Apr. 22, 2021

(51) Int. Cl.
| | |
|---|---|
| *F02K 3/06* | (2006.01) |
| *F02C 9/18* | (2006.01) |
| *F02K 3/115* | (2006.01) |
| *F02K 1/74* | (2006.01) |
| *F02C 7/18* | (2006.01) |
| *F02C 3/04* | (2006.01) |
| *F02C 6/08* | (2006.01) |

(52) U.S. Cl.
CPC .................. *F02K 1/74* (2013.01); *F02C 7/18* (2013.01); *F02C 7/185* (2013.01); *F02K 3/06* (2013.01); *F02C 3/04* (2013.01); *F02C 6/08* (2013.01); *F02C 9/18* (2013.01); *F02K 3/115* (2013.01); *F05D 2220/323* (2013.01); *F05D 2220/36* (2013.01); *F05D 2240/35* (2013.01); *F05D 2260/213* (2013.01); *F05D 2260/606* (2013.01)

(58) Field of Classification Search
CPC .... F05D 2260/213; F02K 3/115; F02K 3/075; F02K 3/077; F02K 3/00–12; F02K 1/06–18; F02K 1/54–766; F02K 7/16; F02C 9/52; F02C 6/06–08; F02C 7/14–143; F02C 7/16–185
See application file for complete search history.

(56) References Cited

U.S. PATENT DOCUMENTS 3,931,708 A * 1/1976 Motycka ............... F02K 1/1207
                                                  60/226.2
7,810,312 B2  10/2010 Stretton et al.
(Continued)

FOREIGN PATENT DOCUMENTS

| DE | 102007023685 | 10/2008 | |
|---|---|---|---|
| GB | 2208702 | 4/1989 | |
| GB | 2208702 A * | 4/1989 | ............... F02C 7/14 |

*Primary Examiner* — Gerald L Sung
*Assistant Examiner* — Stephanie Sebasco Cheng
(74) *Attorney, Agent, or Firm* — Barnes & Thornburg LLP (57) ABSTRACT

A gas turbine engine system includes a gas turbine engine having a fan bypass duct, a heat exchanger system, and a flow transfer unit configured to selectively allow or preclude flow between the fan bypass duct and the heat exchanger system. A controller is coupled to and configured to vary the state of one or more of a fan exit nozzle, a heat exchanger exit nozzle, and a flow control valve controlling flow between the fan bypass duct and the heat exchanger system.

14 Claims, 3 Drawing Sheets

(56) References Cited

U.S. PATENT DOCUMENTS

| | | | |
|---|---|---|---|
| 7,849,702 B2 | 12/2010 | Parikh | |
| 8,122,723 B2 * | 2/2012 | Hocking | F02K 1/46 |
| | | | 60/771 |
| 8,616,834 B2 | 12/2013 | Knight, III et al. | |
| 8,910,465 B2 * | 12/2014 | Snyder | F02K 3/115 |
| | | | 60/266 |
| 9,200,569 B2 * | 12/2015 | Suciu | F02K 3/115 |
| 9,410,482 B2 | 8/2016 | Krautheim et al. | |
| 9,783,306 B2 | 10/2017 | Horner et al. | |
| 9,790,893 B2 * | 10/2017 | Snyder | F02C 7/14 |
| 9,840,967 B2 | 12/2017 | Snyder et al. | |
| 9,964,037 B2 * | 5/2018 | Snyder | F02K 3/077 |
| 10,161,316 B2 * | 12/2018 | Kupratis | F02C 3/13 |
| 10,239,624 B2 | 3/2019 | Behrens et al. | |
| 2008/0028763 A1 * | 2/2008 | Schwarz | F01D 25/12 |
| | | | 60/771 |
| 2010/0043396 A1 | 2/2010 | Coffinberry | |
| 2011/0073716 A1 | 3/2011 | Klimpel | |
| 2017/0159462 A1 * | 6/2017 | Whurr | F04D 29/323 |

\* cited by examiner

GAS TURBINE ENGINE WITH REVERSIBLE HEAT EXCHANGER

STATEMENT REGARDING FEDERALLY SPONSORED RESEARCH OR DEVELOPMENT

Embodiments of the present disclosure were made with government support under U.S. Army Contracting Command—Redstone Contract No. W911W6-16-2-0011. The government may have certain rights.

FIELD OF THE DISCLOSURE

The present disclosure relates generally to gas turbine engines, and more specifically to gas turbine engine systems including a gas turbine engine and a heat exchanger system.

BACKGROUND

Gas turbine engines are used to power aircraft, watercraft, power generators, and the like. Gas turbine engines typically include a compressor, a combustor, and a turbine forming at least part of an engine core. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine.

Gas turbine engines often include a bypass duct arranged annularly around the engine core and a fan configured to propel air from atmosphere through the bypass duct. The air propelled through the bypass duct may be combined with the products of combustion exhausted from the turbine and accelerated through a fan exit nozzle to provide thrust. Under some conditions, for example, when an aircraft is stationary or taking off or landing vertically, such thrust may be undesirable.

Gas turbine engines use lubricating and other hydraulic fluids that may be cooled. Cooling of these fluids may be satisfied by driving the fluids to be cooled through a first side of a heat exchanger and driving cooling air through a second side of the heat exchanger. The cooling air typically is driven through the second side of the heat exchanger using a dedicated blower. Such a dedicated blower may be large and heavy. Both such characteristics may be detrimental to the operation of an aircraft using a gas turbine engine. Also, operation of such a dedicated blower may use a significant amount of power that otherwise could be used to provide thrust or drive an output shaft, thereby reducing engine efficiency.

As suggested above, in some applications, gas turbine engines are used to drive an output shaft that, in turn, may drive a propeller. In such applications, the output shaft may be coupled to the propeller via an intermediate gearbox. The gearbox may generate additional heat that is transferred to the lubricating fluids, thereby increasing the heat load on the heat exchanger.

SUMMARY

The present disclosure may comprise one or more of the following features and combinations thereof.

1. A gas turbine engine system may include a gas turbine engine, a heat exchanger system, and a flow transfer unit. The gas turbine may include an engine core, a fan bypass duct, a first propulsor in the form of a fan, and a fan exit nozzle. The engine core may include a compressor, a combustor, and a turbine arranged along an axis. The fan bypass duct may be arranged annularly around the engine core and may include an inlet, a first outlet, and a second outlet. The fan may be coupled to the turbine for rotation therewith and configured to propel air from atmosphere through the fan bypass duct to provide thrust in a first direction. The fan exit nozzle may be located at the first outlet of the fan bypass duct. The fan exit nozzle may be reconfigurable between a first configuration wherein the fan exit nozzle diffuses air flow through the fan exit nozzle to reduce the thrust in the first direction and a second configuration wherein the fan exit nozzle concentrates air flow through the fan exit nozzle to increase the thrust in the first direction.

The heat exchanger system may be configured to provide cooling for the gas turbine engine, and may include a heat exchanger duct, a heat exchanger exit nozzle, and a heat exchanger. The heat exchanger duct may be radially spaced from the fan bypass duct relative to the axis and have a first inlet, a second inlet, and an outlet. The heat exchanger exit nozzle may be located at the outlet of the heat exchanger duct and may be reconfigurable between a first configuration wherein the heat exchanger exit nozzle allows or increases air flow through the heat exchanger exit nozzle and a second configuration wherein the heat exchanger exit nozzle restricts or reduces air flow through the heat exchanger exit nozzle. The heat exchanger disposed within the heat exchanger duct between the first inlet and the outlet of the heat exchanger duct.

The flow transfer unit may be configured to selectively provide fluid communication between the heat exchanger duct and the fan bypass duct. The flow transfer unit may include a transfer duct connected between the fan bypass duct and the heat exchanger duct, and a flow control valve coupled with the transfer duct and configured to selectively allow or restrict air flow between the fan bypass duct and the heat exchanger duct.

In some embodiments, the gas turbine engine system may further include a controller connected to the fan exit nozzle, the heat exchanger exit nozzle, and the flow control valve. In some embodiments, the controller may be configured to operate the gas turbine engine in one of a thrust mode and a reverse thrust mode.

In some embodiments, the fan exit nozzle may be in the second configuration, the heat exchanger exit nozzle may be in the second configuration, and the flow control valve may be open to allow airflow between the fan bypass duct and the heat exchanger duct in response to the controller operating the gas turbine engine in the reverse thrust mode.

In some embodiments, the fan exit nozzle may be in the first configuration, the heat exchanger exit nozzle may be in the first configuration, and the flow control valve may be closed to restrict airflow between the fan bypass duct and the heat exchanger duct in response to the controller operating the gas turbine engine in the thrust mode.

In some embodiments, air may flow into the heat exchanger duct through the first inlet and exits the heat exchanger duct through the outlet in response to the controller operating the gas turbine engine in the thrust mode.

In some embodiments, the air may exit the heat exchanger duct in a direction substantially the same as the first direction. In some embodiments, air may flow into the heat exchanger duct through the second inlet and exits the heat exchanger duct through the first inlet in response to the controller operating the gas turbine engine in the reverse thrust mode.

In some embodiments, the air may exit the heat exchanger duct in a direction substantially opposite the first direction. In some embodiments, the flow control valve and the heat exchanger exit nozzle may be embodied as a single unit.

According to another aspect of the disclosure, a gas turbine engine system may include a gas turbine engine, a heat exchanger system, and a flow transfer unit. The gas turbine engine may include an engine core, a fan bypass duct, a fan, and a fan exit nozzle. The fan bypass duct may be arranged annularly around the engine core. The fan may be configured to propel air through the fan bypass duct. The fan exit nozzle may be located at an outlet of the fan bypass duct and configured to move between a first thrust position and a second thrust position.

The heat exchanger system may include a heat exchanger duct and a heat exchanger disposed within the heat exchanger duct. In some embodiments, the flow transfer unit may include a transfer duct fluidly connected between the fan bypass duct and the heat exchanger duct and a flow control valve configured to selectively allow or block fluid communication between the fan bypass duct and the heat exchanger duct.

In some embodiments, the gas turbine engine system may further include a controller connected to the fan exit nozzle and the flow control valve. The controller may be configured to operate the gas turbine engine in one of a thrust mode and a reverse thrust mode.

In some embodiments, the flow control valve may be further configured to allow fluid communication through an outlet of the heat exchanger when the flow control valve blocks fluid communication between the fan bypass duct and the heat exchanger duct, and the flow control valve further may be configured to block fluid communication through the outlet of the heat exchanger when the flow control valve allows fluid communication between the fan bypass duct and the heat exchanger duct.

In some embodiments, air may flow into the heat exchanger duct through a first inlet of the heat exchanger duct and exit the heat exchanger duct through the outlet in response to the controller operating the gas turbine engine in the thrust mode, and air may flow into the heat exchanger duct through a second inlet of the heat exchanger duct and exit the heat exchanger duct through the first inlet in response to the controller operating the gas turbine engine in the reverse thrust mode.

In some embodiments, the fan exit nozzle may be in the first thrust position in response to the controller operating the gas turbine engine in the thrust mode, and the fan exit nozzle may be in the second thrust position in response to the controller operating the gas turbine engine in the reverse thrust mode.

In some embodiments, the gas turbine engine may produce greater thrust in a first direction when the fan exit nozzle is in the first thrust position, and the gas turbine engine may produce lesser thrust in the first direction when the fan exit nozzle is in the second thrust position.

In some embodiments, the heat exchanger system may include a heat exchanger exit nozzle configured to allow flow through an outlet of the heat exchanger duct in response to the controller operating the gas turbine engine in the thrust mode. The heat exchanger exit nozzle may further be configured to block flow through the outlet of the heat exchanger duct in response to the controller operating the gas turbine engine in the reverse thrust mode.

According to another aspect of the disclosure, a method of operating a gas turbine engine may include providing a gas turbine engine having an engine core, a fan bypass duct arranged annularly around the engine core, a fan coupled to the engine core, and a fan exit nozzle, the fan configured to propel air from atmosphere through the fan bypass duct and the fan exit nozzle to provide thrust in a first direction, a heat exchanger duct radially spaced from the fan bypass duct, the heat exchanger duct having a first inlet, a second inlet, and an outlet, a heat exchanger disposed within the heat exchanger duct, and a transfer duct connected between and in selective fluid communication with the fan bypass duct and the heat exchanger duct.

In some embodiments, the method may include blocking flow from the fan bypass duct to the heat exchanger duct, and allowing flow into the heat exchanger duct from the first inlet and out of the heat exchanger duct through the outlet in a thrust mode of operation.

In some embodiments, the method may include allowing flow from the fan bypass duct into the heat exchanger duct via the transfer duct and the second inlet, and out of the heat exchanger duct through the first inlet, while restricting or blocking flow through the outlet in a reverse thrust mode of operation.

In some embodiments, the method may include configuring the fan exit nozzle in a first configuration in the thrust mode of operation and configuring the fan exit nozzle in a second configuration in the reverse thrust mode of operation.

In some embodiments, the method may include the gas turbine engine producing greater thrust in a first direction when the fan exit nozzle is in the first thrust position, and the gas turbine engine producing lesser thrust in the first direction when the fan exit nozzle is in the second thrust position.

In some embodiments, the method may include flow exiting the heat exchanger producing thrust in the first direction in the thrust mode of operation and flow exiting the heat exchanger producing thrust in a second direction substantially opposite the first direction in the reverse thrust mode of operation.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

A gas turbine engine system 10 according to the present disclosure includes a gas turbine engine 12, a heat exchanger system 14, and a flow transfer unit 16 selectively coupling the gas turbine engine 12 and the heat exchanger system 14 in fluid communication with each other, as suggested in FIGS. 1-5.

Figure 1:
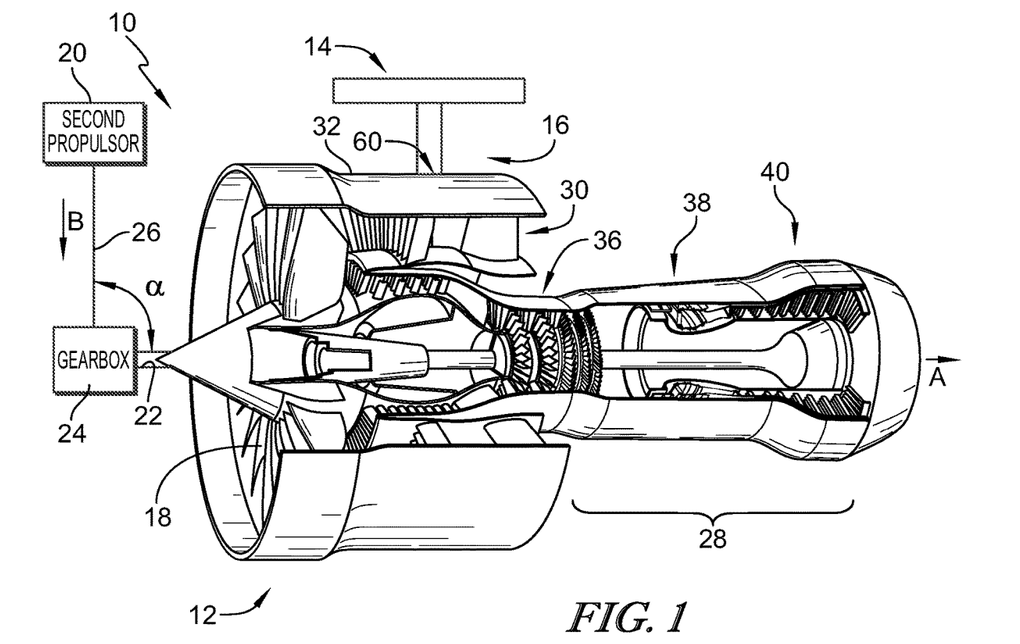
FIG. 1 is a diagrammatic view of a gas turbine engine system in accordance with the present disclosure showing that the gas turbine engine system includes a gas turbine engine including a first propulsor, a heat exchanger system located radially outward of the gas turbine engine, a flow transfer unit, a second propulsor, and a gearbox connecting the second propulsor to an output shaft of the gas turbine engine.

The gas turbine engine 12 includes a first propulsor or fan 18 that may provide thrust in a first direction A, for example, an axially aft direction, for propelling an aircraft as suggested in FIG. 1. The gas turbine engine system 10 may include a second propulsor 20, for example, a propeller. The second propulsor 20 may be selectively connected to an output shaft or turboshaft 22 of the gas turbine engine 12 directly or through an intermediate gearbox 24 and a second propulsor shaft 26. The gearbox 24 may be configured to change the direction of torque produced by the gas turbine engine 12 and input thereto by the turboshaft 22 through an angle α, for example, an angle of about 90 degrees so that the second propulsor shaft 26 rotates at the angle α with respect to the turboshaft 22. In such an embodiment, the gas turbine engine system 10 may be selectively operated in a turbofan fan mode in which the first propulsor 18 provides thrust in the first direction A to propel an aircraft and a turboshaft mode in which the second propulsor 20 provides thrust in a second direction B to lift the aircraft.

The gas turbine engine 12 includes the fan 18, an engine core 28, a fan bypass duct 30 arranged annularly around the engine core 28 and defined in part by an engine housing 32, and an adjustable fan exit nozzle 34. The engine core 28 includes a compressor 36, a combustor 38, and a turbine 40. The turbine 40 is coupled by a shaft or spool to the turbofan 18. The turbine 40 also may be similarly coupled to the turboshaft 22. The fan exit nozzle 34 is reconfigurable between a first configuration in which the fan exit nozzle 34 diffuses airflow therethrough to reduce the thrust in the first direction A (as shown in FIG. 3), and a second configuration in which the fan exit nozzle concentrates and accelerates airflow therethrough to increase the thrust in the first direction A (as shown in FIG. 2).

Figure 2:
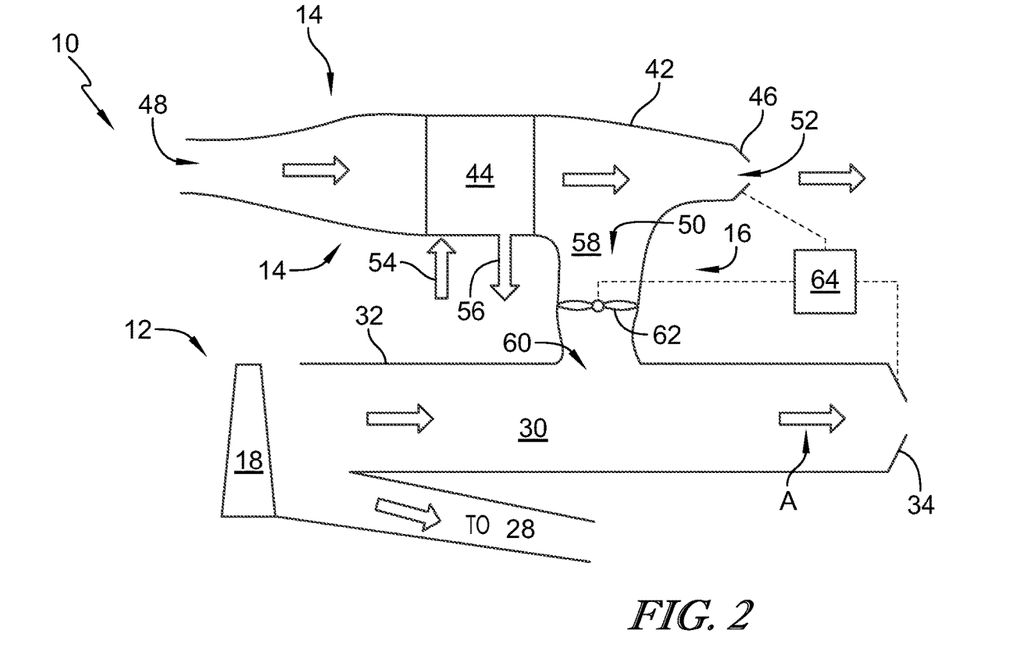
FIG. 2 is a diagrammatic view of the gas turbine engine system of FIG. 1 showing the gas turbine engine system in a first or thrust mode of operation in which a fan exit nozzle of the gas turbine engine is configured to provide thrust in a first direction, a heat exchanger exit nozzle of the heat exchanger is configured to allow airflow therethrough, and a flow control valve of the flow transfer unit is closed to restrict or preclude airflow through a transfer duct of the flow transfer unit.
Figure 3:
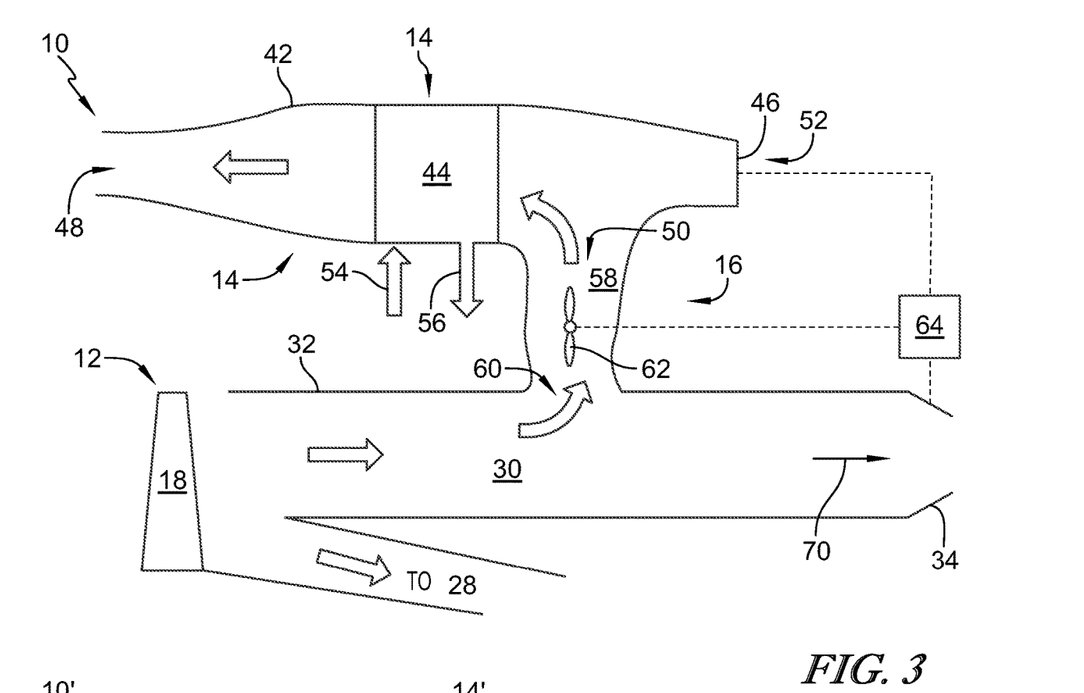
FIG. 3 is a diagrammatic view of the gas turbine engine system of FIG. 1 showing the gas turbine engine system in a second or reverse thrust mode of operation in which the fan exit nozzle is configured to reduce thrust in the first direction, the heat exchanger exit nozzle of the heat exchanger is configured to restrict or preclude airflow therethrough, and a flow control valve of the flow transfer unit is open to enable airflow through the transfer duct of the flow transfer unit.

The heat exchanger system 14 includes a heat exchanger duct 42, a heat exchanger 44 disposed within the heat exchanger duct 42, and an adjustable heat exchanger exit nozzle 46 as shown in FIG. 2. The heat exchanger duct 42 includes a first inlet 48, a second inlet 50, and an outlet 52. The first and second inlets 48, 50 are reversible, as suggested by FIGS. 2-5 and as will be discussed further below. The first inlet 48 may be, but need not be, a NACA inlet.

The heat exchanger 44 is located between the first inlet 48, the second inlet 50, and the outlet 52 so that cooling air may selectively flow (i) into the heat exchanger duct 42 through the first inlet 48, through the heat exchanger 44, and out of the heat exchanger duct 42 through the second inlet 50; (ii) into the heat exchanger duct 42 through the second inlet 50, through the heat exchanger 44, and out of the heat exchanger duct through the first inlet 48; or (iii) into the heat exchanger duct 42 through the first inlet 48, through the heat exchanger 44, and out of the heat exchanger duct 42 through the outlet 52, as suggested by FIGS. 2-5 and as will be discussed further below.

The heat exchanger exit nozzle 46 is located at the outlet 52. The heat exchanger exit nozzle 46 is reconfigurable between a first configuration in which the heat exchanger exit nozzle 46 allows or increases airflow therethrough, and a second configuration in which the heat exchanger exit nozzle 46 restricts, decreases or substantially precludes airflow therethrough. The heat exchanger 44 includes a fluid inlet 54 and a fluid outlet 56 configured, respectively, to receive and return fluids to be cooled by the heat exchanger 44. Such fluids may be oil, fuel, or other suitable alternatives. Illustratively, the heat exchanger 44 is an air-fluid heat exchanger 44.

The flow transfer unit 16 includes a transfer duct 58 connected between and in fluid communication with the fan bypass duct 30 via a port 60 in the housing 32 and the second inlet 50 of the heat exchanger duct 42 as shown in FIGS. 2 and 3. The flow transfer unit 16 also includes a flow control valve 62 disposed within the transfer duct 58. The flow control valve 62 is shown in the drawings as a butterfly valve, but it may be embodied as any suitable form of valve, damper, flap, inflatable bladder, or other airflow control device. The flow control valve 62 is reconfigurable between a first configuration in which the flow control valve 62 is closed, thereby restricting or precluding airflow through the transfer duct 58 (as shown in FIG. 2), and a second configuration in which the flow control valve is open, thereby allowing or enabling increased airflow through the transfer duct (as shown in FIG. 3). The flow control valve 62 can be varied between a plurality of partially opened orientations between the closed and fully open positions.

FIG. 2 shows the gas turbine engine system 10 configured in a first mode or thrust mode. The thrust mode may be employed in connection with the aircraft in normal flight (horizontal movement to produce lift). As such, it may be desired to have a large amount of thrust in the first direction A.

In the thrust mode, the flow control valve 62 is in the first configuration, thereby reducing or precluding airflow through the transfer duct 58. As such, air propelled by the fan 18 is driven through the bypass duct 30 and out of the gas turbine engine 12 through the fan exit nozzle 34, with little or none of the air flowing through the transfer duct 58. The air driven through the bypass duct may be combined with the air flowing through the engine core 28 prior to exiting the gas turbine engine 12 through the fan exit nozzle 34. The fan exit nozzle 34 is in the second configuration to concentrate or accelerate flow through the fan exit nozzle, thereby providing or increasing thrust in the first direction A. The heat exchanger exit nozzle 46 is in the first configuration, thereby allowing air to flow axially therethrough from the inlet 48 to the outlet 52.

In the first configuration, the heat exchanger exit nozzle 46 may be, but need not be, configured to concentrate or accelerate the air flowing therethrough to provide additional thrust in the first direction A. In the thrust mode, cooling air enters the heat exchanger duct 58 through the first inlet 48, passes through the heat exchanger 44, and exits the heat exchanger through the outlet 52 and the heat exchanger exit nozzle 46. Little or no air flows through the transfer duct 58.

FIG. 3 shows the gas turbine engine system 10 configured in a second mode or reverse thrust mode. The reverse thrust mode may be employed with the aircraft taking off or landing vertically. As such, it may be desirable to have low or zero net thrust in the first direction A.

In the reverse thrust mode, the flow control valve 62 is in the second configuration, thereby allowing some or all of the air propelled by the fan 18 to be driven from the fan bypass duct 30 into and through the transfer duct 58, while any remaining air passing through the bypass duct 30 exits the fan bypass duct and the gas turbine engine 12 through the fan exit nozzle 34. The air driven through the bypass duct may be combined with the air flow through the engine core 28 prior to exiting the gas turbine engine 12 through the fan exit nozzle 34. The fan exit nozzle 34 is in the first configuration to diffuse airflow through the fan exit nozzle, thereby reducing thrust in the first direction A as suggested by arrow 70. The thrust in the first direction A may be reduced to a zero amount of thrust.

The heat exchanger exit nozzle 46 is in the second configuration, thereby restricting or precluding airflow therethrough as suggested in FIG. 3. In the reverse thrust mode, cooling air enters the heat exchanger duct 58 from the fan bypass duct 30 through the second inlet 50, passes through the heat exchanger 44, and exits the heat exchanger through the first inlet 48. The air exiting the first inlet 48 may provide reverse thrust in a direction substantially opposite the first direction A. As a result, the thrust provided by the air exiting the first inlet 48 can counteract any thrust exiting the fan exit nozzle 34 to reduce or eliminate a net thrust in the first direction A. This may be beneficial in vertical take-off and landing where horizontal movement may not be desired.

A controller 64 may be coupled to the fan exit nozzle 34, the heat exchanger exit nozzle 46, and the flow control valve 62 and configured to provide control signals thereto to selectively place the fan exit nozzle 34, the heat exchanger exit nozzle 46, and the flow control valve 62 in the foregoing thrust mode and reverse thrust mode alignments. The controller 64 may further be configured to place the fan exit nozzle 34, the heat exchanger exit nozzle 46, and the flow control valve 62 in other alignments as may be desired.

Figure 4:
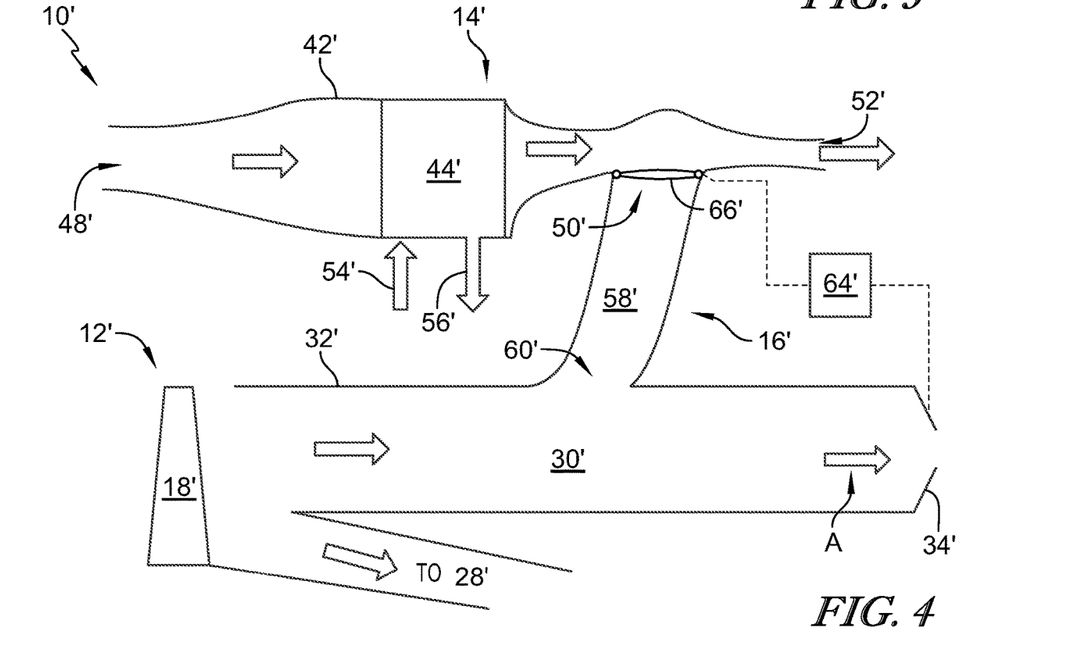
FIG. 4 is a diagrammatic view of an alternative gas turbine engine system according to the present disclosure and similar to the gas turbine engine system of FIG. 1 but including an alternative flow control valve in lieu of the flow control valve and heat exchanger exit nozzle shown in FIGS. 2 and 3, with the alternative gas turbine engine system in a first or thrust mode of operation in which the fan exit nozzle of the gas turbine engine is configured to provide thrust in a first direction and the alternative flow control valve is configured to allow airflow through an outlet of the heat exchanger duct and to restrict or preclude airflow through the transfer duct of the flow transfer unit.
Figure 5:
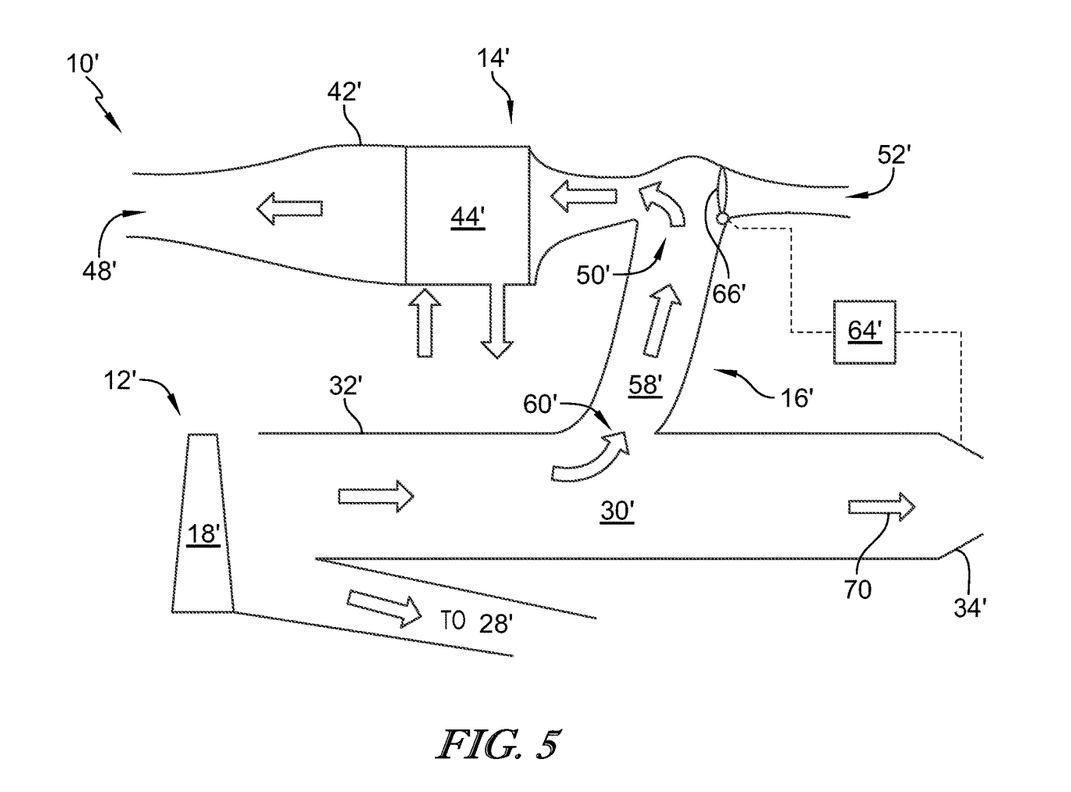
FIG. 5 is a diagrammatic view of the alternative gas turbine engine system of FIG. 4 in a second or reverse thrust mode of operation in which the fan exit nozzle of the gas turbine engine is configured to reduce thrust in the first direction and the alternative flow control valve is configured to restrict or preclude airflow through the outlet of the heat exchanger duct and to allow airflow through the transfer duct of the flow transfer unit.

FIGS. 4 and 5 show an alternate gas turbine engine system 10' similar to the gas turbine engine system 10 show in FIGS. 1-3, wherein elements of the system 10' corresponding to elements of the system 10 are identified using like, but primed reference characters. The gas turbine engine system 10' is in most respects the same as the gas turbine engine system 10. The gas turbine engine system 10' differs from the gas turbine engine system 10 primarily in that the gas turbine engine system 10' lacks discrete elements corresponding to the adjustable heat exchanger exit nozzle 46 and the flow control valve 62 and includes in their places a flow control valve 66'.

The flow control valve 66' is reconfigurable between a first configuration (shown in FIG. 4) wherein the alternative flow control valve simultaneously restricts or precludes flow through the transfer duct 58 and allows flow through the heat exchanger outlet 52, and a second configuration (shown in FIG. 5) wherein the alternative flow control valve simultaneously allows flow through the transfer duct 58 and restricts or precludes flow through the heat exchanger outlet 52.

FIG. 4 shows another embodiment of a gas turbine engine system 10' configured in a first or thrust mode. The gas turbine engine system 10' includes a reduced number of valves or nozzles as compared with the gas turbine engine system 10.

In the thrust mode, the flow control valve 66' is in the first configuration, thereby reducing or precluding airflow through the transfer duct 58' and allowing flow through the outlet 52' of the heat exchanger duct 42'. As such, air propelled by the fan 18' is driven through the bypass duct 30' and out of the gas turbine engine 12' through the fan exit nozzle 34', with little or none of the air flowing through the transfer duct 58'. The air driven through the bypass duct may be combined with the air flowing through the engine core 28' prior to exiting the gas turbine engine 12' through the fan exit nozzle 34'. The fan exit nozzle 34 is in the second configuration to concentrate or accelerate flow through the fan exit nozzle 34, thereby providing or increasing thrust in the first direction A.

In the thrust mode, cooling air enters the heat exchanger duct 58' through the first inlet 48', passes through the heat exchanger 44', and exits the heat exchanger through the outlet 52'. Little or no air flows through the transfer duct 58'.

FIG. 5 shows the gas turbine engine system 10' configured in a second or reverse thrust mode. In the reverse thrust mode, the flow control valve 66' is in the second configuration, thereby allowing some of the air propelled by the fan 18' to be driven from the fan bypass duct 30' into and through the transfer duct 58' and restricting or precluding flow through the outlet 52' of the heat exchanger duct 42'. Any remaining air passing through the fan bypass duct 30' exits the fan bypass duct and the gas turbine engine 12' through the fan exit nozzle 34' at a low or zero thrust as suggested by arrow 70'. The air driven through the fan bypass duct 30' may be combined with the airflow through the engine core 28' prior to exiting the gas turbine engine 12' through the fan exit nozzle 34'. The fan exit nozzle 34' is in the first configuration to diffuse airflow through the fan exit nozzle 34, thereby reducing thrust in the first direction A. The heat exchanger exit nozzle 46' is in the second configuration, thereby restricting or precluding airflow therethrough.

In the reverse thrust mode, cooling air enters the heat exchanger duct 58' from the fan bypass duct 30' through the second inlet 50', passes through the heat exchanger 44', and exits the heat exchanger through the first inlet 48'. The air exiting the first inlet 48' may provide reverse thrust in a direction substantially opposite the first direction A.

The present disclosure provides use of a variable control device 62 between the fan exit nozzle 34 and the heat exchanger 44 so as to change the direction of the flow through the heat exchanger 44. The system 10 includes the heat exchanger 44 for managing heat load, a fan driven propulsion system, and a series of flow control devices 34, 62, 66.

When the vehicle or aircraft is static (or low forward velocity), the heat exchanger 44 is supplied with pressurized air from the fan 18 with flow control valve 62 open and nozzle 66 closed as suggested in FIG. 3. The air exits out the heat exchanger 44 via inlet 48 providing reverse thrust. This reverse thrust could be beneficial because often in static conditions it is desirable to have minimal thrust.

Then when there is ram air, for example due to forward flight velocity, the flow control valve 62 between the fan 18 and the heat exchanger 44 is closed and the nozzle 66 is opened. Having this ram air fed configuration may be beneficial because it may provide cooler air than the fan pressurized air.

In some embodiments, the flow control valve 62 and heat exchanger exit nozzle 46 are combined into one device 66'. As shown in FIGS. 4 and 5. The device 66' could be configured to either let flow into it from the fan 18 or let flow out of the heat exchanger nozzle 46.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine system comprising:
   a gas turbine engine configured to provide thrust for propelling an aircraft, the gas turbine engine system including an engine core, a fan bypass duct, a first propulsor in the form of a fan, and a fan exit nozzle, the engine core including a compressor, a combustor, and a turbine arranged along an axis, the fan bypass duct arranged annularly around the engine core and having an inlet and a first outlet, the fan coupled to the turbine for rotation therewith and configured to propel air from atmosphere through the fan bypass duct to provide the thrust in a first direction extending from the inlet of the fan bypass duct toward the first outlet of the fan bypass duct, the fan exit nozzle located at the first outlet of the fan bypass duct, and the fan exit nozzle reconfigurable between a first configuration wherein the fan exit nozzle diffuses airflow through the fan exit nozzle to reduce the thrust in the first direction and a second configuration wherein the fan exit nozzle concentrates airflow through the fan exit nozzle to increase the thrust in the first direction;
   a heat exchanger system configured to provide cooling for the gas turbine engine, the heat exchanger system including a heat exchanger duct, a heat exchanger exit nozzle, and a heat exchanger, the heat exchanger duct being radially outwardly spaced from the fan bypass duct relative to the axis and having a first inlet receiving a first flow of cooling air and a first outlet discharging the first flow of cooling air, the heat exchanger disposed within the heat exchanger duct between the first inlet of the heat exchanger duct and the first outlet of the heat exchanger duct, and the heat exchanger exit nozzle located at the first outlet of the heat exchanger duct and reconfigurable between a first configuration and a second configuration, wherein the heat exchanger exit nozzle allows greater airflow therethrough when the heat exchanger exit nozzle is in the first configuration and lesser airflow therethrough when the heat exchanger exit nozzle is in the second configuration; and
   a flow transfer unit configured to selectively provide fluid communication between the heat exchanger duct and the fan bypass duct, the flow transfer unit including a transfer duct connected between the fan bypass duct and the heat exchanger duct, wherein the transfer duct cooperates with the fan bypass duct to define a second outlet of the fan bypass duct discharging a second flow of cooling air and wherein the transfer duct cooperates with the heat exchanger duct to define a second inlet of the heat exchanger duct receiving the second flow of cooling air between the heat exchanger and the first outlet of the heat exchanger duct, and a flow control valve coupled with the transfer duct and configured to selectively allow or restrict airflow from the fan bypass duct to the heat exchanger duct; and
   wherein the first inlet of the heat exchanger duct is reversed to be a second outlet of the heat exchanger duct discharging the second flow of cooling air when the heat exchanger exit nozzle is in the second configuration and the flow control valve allows airflow from the fan bypass duct to the heat exchanger duct.

2. The gas turbine engine system of claim 1, further comprising a controller connected to the fan exit nozzle, the heat exchanger exit nozzle, and the flow control valve, the controller configured to operate the gas turbine engine in one of a thrust mode and a reverse thrust mode.

3. The gas turbine engine system of claim 2, wherein the fan exit nozzle is in the second configuration, the heat exchanger exit nozzle is in the first configuration, and the flow control valve is open to allow airflow between the fan bypass duct and the heat exchanger duct in response to the controller operating the gas turbine engine in the reverse thrust mode.

4. The gas turbine engine system of claim 2, wherein the fan exit nozzle is in the first configuration, the heat exchanger exit nozzle is in the second configuration, and the flow control valve is closed to restrict airflow between the fan bypass duct and the heat exchanger duct in response to the controller operating the gas turbine engine in the thrust mode.

5. The gas turbine engine system of claim 2, wherein the first flow of cooing air flows into the heat exchanger duct through the first inlet of the heat exchanger duct and exits the heat exchanger duct through the first outlet of the heat exchanger duct in response to the controller operating the gas turbine engine in the thrust mode.

6. The gas turbine engine system of claim 5, wherein the first flow of cooling air exits the first outlet of the heat exchanger duct in a direction substantially the same as the first direction.

7. The gas turbine engine system of claim 2, wherein the second flow of cooling air flows into the heat exchanger duct through the second inlet of the heat exchanger duct and exits the heat exchanger duct through the first inlet of the heat exchanger duct in response to the controller operating the gas turbine engine in the reverse thrust mode.

8. The gas turbine engine system of claim 7, wherein the second flow of cooling air exits the first inlet of the at exchanger duct in a direction substantially opposite the first direction.

9. A gas turbine engine system comprising:
   a gas turbine engine that includes an engine core, a fan bypass duct, a fan, and a fan exit nozzle, the fan bypass duct arranged annularly around the engine core, the fan configured to propel air through the fan bypass duct, and the fan exit nozzle located at a first outlet of the fan bypass duct and configured to move between a first thrust position and a second thrust position;

a heat exchanger system that includes a heat exchanger duct radially outwardly spaced from the fan bypass duct relative to the axis, a heat exchanger disposed within the heat exchanger duct between a first inlet of the heat exchanger duct and a first outlet of the heat exchanger duct, and a heat exchanger exit nozzle at the first outlet of the heat exchanger duct, wherein the first inlet of the heat exchanger duct receives a first flow of cooling air and the first outlet of the heat exchanger duct discharges the first flow of cooling air, and wherein the heat exchanger exit nozzie is reconfigurable between a first configuration that allows greater airflow therethrough and a second configuration that allows lesser airflow therethrough; and a flow transfer unit that includes a transfer duct fluidly connected between the fan bypass duct and the heat exchanger duct and a flow control valve configured to selectively allow or block fluid communication between the fan bypass duct and the heat exchanger duct, wherein the transfer duct cooperates with the fan bypass duct to define a second outlet of the fan bypass duct discharging a second flow of cooling air, wherein the transfer duct cooperates with the heat exchanger duct to define a second inlet of the heat exchanger duct receiving the second flow of cooling air, and wherein the second inlet of the heat exchanger duct is located between the heat exchanger and the first outlet of the heat exchanger duct; and wherein the first inlet of the heat exchanger duct is reversed to be a second outlet of the heat exchanger duct discharging the second flow of cooling air when the heat exchanger exit nozzle is in the second configuration and the flow control vive allows airflow from the fan bypass duct to the heat exchanger duct.

10. The gas turbine engine system of claim 9, further comprising a controller connected to the fan exit nozzle and the flow control valve, the controller configured to operate the gas turbine engine in one of a thrust mode and a reverse thrust mode.

11. The gas turbine engine system of claim 10, wherein the first flow of cooling air flows into the heat exchanger duct through the first inlet of the heat exchanger duct and exits the heat exchanger duct through the first outlet of the heat exchanger duct in response to the controller operating the gas turbine engine in the thrust mode, and wherein the second flow of cooling air flows into the heat exchanger duct through the second inlet of the heat exchanger duct and exits the heat exchanger duct through the first inlet of the heat exchanger duct, which becomes the second outlet of the heat exchanger duct in response to the controller operating the gas turbine engine in the reverse thrust mode.

12. The gas turbine engine system of claim 11, wherein the fan exit nozzle is in the first thrust position in response to the controller operating the gas turbine engine in the thrust mode, and wherein the fan exit nozzle is in the second thrust position in response to the controller operating the gas turbine engine in the reverse thrust mode.

13. The gas turbine engine system of claim 12, wherein the gas turbine engine produces greater thrust in a first direction when the fan exit nozzle is in the first thrust position, and wherein the gas turbine engine produces lesser thrust in the first direction when the fan exit nozzle is in the second thrust position.

14. The gas turbine engine system of claim 10, wherein the heat exchanger exit nozzle is configured to allow airflow through the first outlet of the heat exchanger duct in response to the controller operating the gas turbine engine in the thrust mode, and wherein the heat exchanger exit nozzle further is configured to block airflow through the first outlet of the heat exchanger duct in response to the controller operating the gas turbine engine in the reverse thrust mode.

\* \* \* \* \*